(12) United States Patent
Terao

(10) Patent No.: US 9,719,609 B2
(45) Date of Patent: Aug. 1, 2017

(54) CHANGE-OVER VALVE

(71) Applicant: KAYABA INDUSTRY CO., LTD., Minato-ku, Tokyo (JP)

(72) Inventor: Takeshi Terao, Sagamihara (JP)

(73) Assignee: KYB Corporation, Tokyo (JP)

( * ) Notice: Subject to any disclaimer, the term of this patent is extended or adjusted under 35 U.S.C. 154(b) by 214 days.

(21) Appl. No.: 14/372,754

(22) PCT Filed: Mar. 12, 2013

(86) PCT No.: PCT/JP2013/056765
§ 371 (c)(1),
(2) Date: Jul. 17, 2014

(87) PCT Pub. No.: WO2013/137235
PCT Pub. Date: Sep. 19, 2013

(65) Prior Publication Data
US 2015/0013805 A1    Jan. 15, 2015

(30) Foreign Application Priority Data

Mar. 15, 2012 (JP) ................. 2012-058164

(51) Int. Cl.
*F16K 31/12* (2006.01)
*F16K 11/07* (2006.01)
(Continued)

(52) U.S. Cl.
CPC ........ *F16K 31/1221* (2013.01); *F15B 13/042* (2013.01); *F16K 11/07* (2013.01);
(Continued)

(58) Field of Classification Search
CPC .... F16K 31/1221; F16K 31/124; F16K 11/07; F15B 13/0412; F15B 2211/329;
(Continued)

(56) References Cited

U.S. PATENT DOCUMENTS 5,996,464 A    12/1999 McLevige et al.
6,223,773 B1 *   5/2001 Knoell ............... A01B 63/1013
                                              137/596.15
(Continued)

FOREIGN PATENT DOCUMENTS

DE    3840328 A1    5/1990
EP    2093431 A2    8/2009
(Continued)

OTHER PUBLICATIONS

Office Action dated Oct. 27, 2014, corresponding to Korean patent application No. 10-2014-7003272.
(Continued)

*Primary Examiner* — Mary McManmon
*Assistant Examiner* — Daphne M Barry
(74) *Attorney, Agent, or Firm* — Hauptman Ham, LLP

(57) ABSTRACT

A change-over valve comprises a spool housed in a spool housing, and a pilot chamber facing at least an end of the spool. An axial passage is formed in the spool along the axial direction. While being connected to a pilot chamber, the axial passage communicates with a tank passage via a small hole having an opening on an outer periphery of the spool in accordance with displacement of the spool, to discharge the air in the pilot chamber to the tank passage. Since the axial passage is formed at a location offset from a center axis of the spool, a length of the small hole is shortened and the small hole is easily processed.

6 Claims, 6 Drawing Sheets

(51) Int. Cl.
*F15B 21/04* (2006.01)
*F15B 13/04* (2006.01)
*F16K 31/122* (2006.01)
*F15B 13/042* (2006.01)
*F16K 31/124* (2006.01)

(52) U.S. Cl.
CPC ...... *F16K 11/0712* (2013.01); *F16K 11/0716* (2013.01); *F16K 31/124* (2013.01); *F15B 21/044* (2013.01); *F15B 2211/329* (2013.01); *F15B 2211/355* (2013.01); *Y10T 137/8671* (2015.04); *Y10T 137/86582* (2015.04)

(58) Field of Classification Search
CPC .............. F15B 2211/355; F15B 21/044; Y10T 137/8671; Y10T 137/86582
See application file for complete search history.

(56) References Cited

U.S. PATENT DOCUMENTS 7,131,368 B2  11/2006  Jeon
7,650,907 B2 *  1/2010  Goto ..................... F15B 11/044
                                                      137/625.69

FOREIGN PATENT DOCUMENTS

| JP | 60-179578 A | 9/1985 |
| JP | 531037 B2 | 5/1993 |
| JP | 567802 B2 | 9/1993 |
| JP | 7279908 A | 10/1995 |
| JP | 2510475 Y2 | 9/1996 |
| JP | 2002317802 A | 10/2002 |
| JP | 2003172310 A | 6/2003 |
| KR | 10-0621983 B1 | 9/2006 |

OTHER PUBLICATIONS

Extended European Search Report dated Jul. 9, 2015, corresponding to European patent application No. 13760558.0.
International Search Report with Written Opinion mailed Jun. 18, 2013, corresponding International Application No. PCT/JP2013/056765.

* cited by examiner

US 9,719,609 B2

CHANGE-OVER VALVE

RELATED APPLICATIONS

The present application is a National Phase of International Application Number PCT/JP2013/056765, filed Mar. 12, 2013, which claims priority to Japanese Application Number 2012-058164, filed Mar. 15, 2012.

TECHNICAL FIELD

This invention relates to a change-over valve for changing over flow passages by moving a spool with a pilot pressure.

BACKGROUND ART

JP2003-172310A published by the Japan Patent Office proposes a pilot type change-over valve for controlling a flow of pressurized oil by moving a spool with a pilot pressure and changing over passages formed in a spool housing.

In this type of change-over valve, the spool is assembled into a spool hole, which is formed in the spool housing so as to be free to slide in a state where an end surface of the spool faces a pilot chamber.

When a pilot pressure is applied to the pilot chamber while the air mixed into working oil remains in the pilot chamber as bubbles, a target pilot pressure cannot be precisely applied to the spool due to shrinkage of the bubbles. Thus, the prior art proposes to provide a small hole for discharging the air in the pilot chamber in accordance with displacement of the spool.

SUMMARY OF INVENTION

When the small hole has a large sectional area, the pressure of the pilot chamber is lowered. Therefore, the small hole is required to have a small sectional area. However, it is difficult to drill a minute small hole from an outer periphery of the spool to a center axis thereof. In particular, when a diameter of the spool is large, a drilling tool to accomplish the job tends to be damaged easily.

It is therefore an object of this invention to render formation of a discharge passage of the air in the pilot chamber easy.

In order to achieve the above object, a change-over valve according to this invention comprises a spool housing, a spool housed in the spool housing so as to be free to slide, the spool having a center axis, a pilot chamber facing an end of the spool, an axial passage formed in the spool at a location offset from the center axis so as to be connected to the pilot chamber, a small hole connected to the axial passage and having an opening on an outer periphery of the spool, and a passage formed in the spool housing to connect the small hole to a drain in a predetermined sliding position of the spool with respect to the spool housing.

The details as well as other features and advantages of this invention are set forth in the remainder of the specification and are shown in the accompanying drawings.

DESCRIPTION OF EMBODIMENTS

Figure 1:
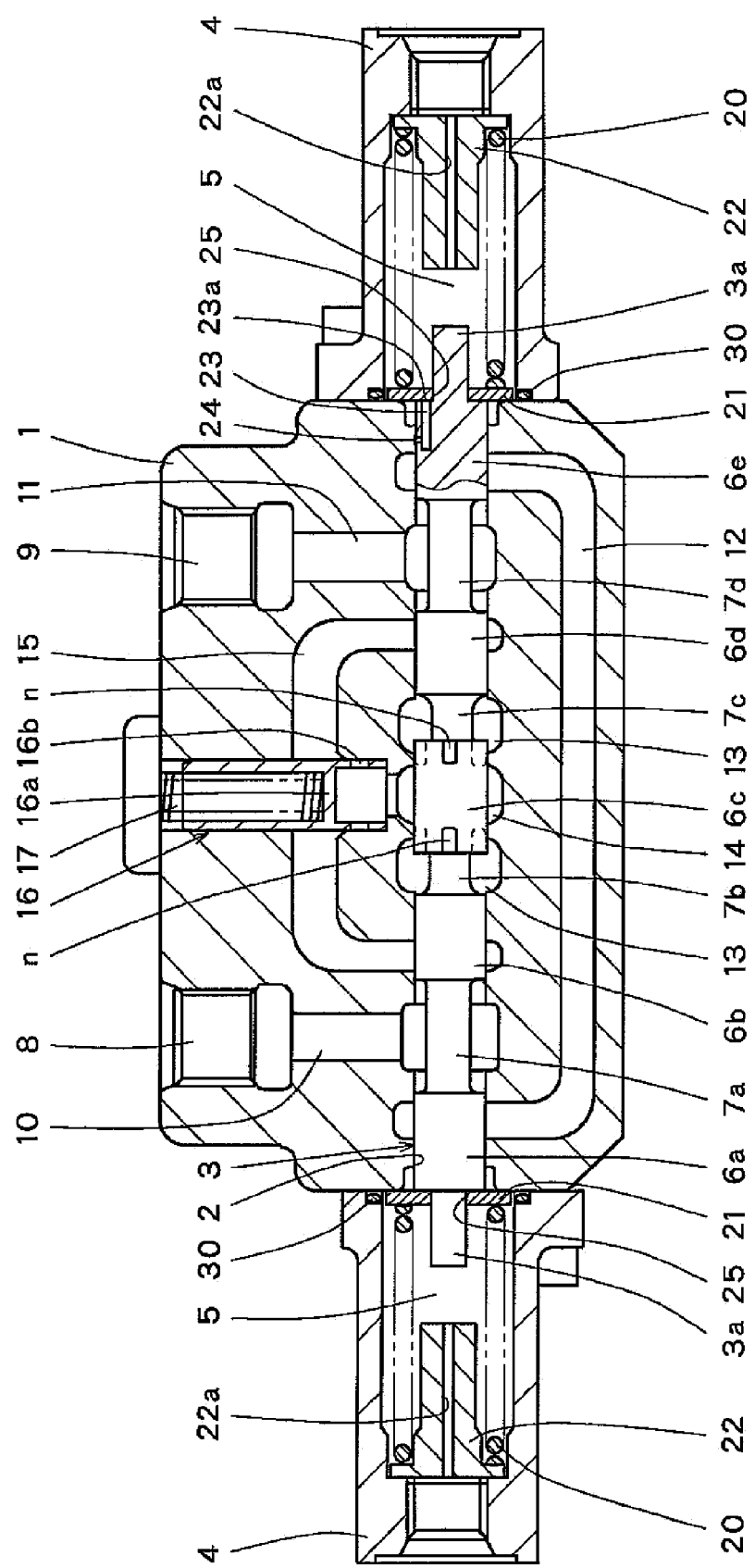
FIG. 1 is a vertical sectional view of a change-over valve according to a first embodiment of this invention.

Referring to FIG. 1 of the drawings, a change-over valve according to a first embodiment of this invention comprises a spool 3 housed in a spool hole 2 so as to be free to slide. The spool hole 2 is formed in a spool housing 1 The spool 3 is formed into a columnar shape having a center axis, and both ends of the spool 3 respectively face pilot chambers 5 in a pair of caps 4 that are fixed to the spool housing 1 so as to face each other.

In the spool 3, a plurality of lands 6a to 6e to be brought into sliding contact with the spool hole 2 and annular indentations 7a to 7d are alternately formed. The spool 3 slides leftward and rightward in the figure in accordance with pilot pressures conducted to the pilot chambers 5 on both the sides. Notches n respectively communicating with the annular indentations 7b and 7c are formed on both ends of the center land 6c.

A pair of actuator ports 8 and 9 is formed in the spool housing 1. A plurality of passages facing an outer periphery of the spool 3 is formed in the spool housing 1.

Specifically, an actuator passage 10 communicating with the actuator port 8, an actuator passage 11 communicating with the actuator port 9, a tank passage 12 connected to a tank, a pump passage 13 connected to a hydraulic pump, a center passage 14, and a bridging passage 15 are formed in the spool housing 1.

The center passage 14 and the bridging passage 15 are connected via a flow control valve 16 housed in the spool housing 1. The flow control valve 16 is formed in a cylindrical shape inside which a partition 16a is formed. The flow control valve 16 is housed in a hole formed to traverse the bridging passage 15 from an outer periphery of the spool housing 1 toward the center passage 14. Two chambers on the leading end side and on the base end side are formed by the partition 16a inside the flow control valve 16. A pair of communicating holes 16b communicating with the chamber on the leading end side is formed on an outer periphery of the flow control valve 16. A spring member 17 for pressing the flow control valve 16 along the direction of the center passage 14 is accommodated in the chamber on the base end side.

Coil springs 20 for retaining the spool 3 in a neutral position in a case where the pilot pressures in the two pilot chambers 5 are equalized are respectively provided in the caps 4.

The spool 3 comprises small-diameter projections 3a projecting in the pilot chambers 5. The spool 3 is abutted with ends of the coil springs 20 via ring shape spring seats 21 fitted to outer peripheries of the projections 3a via slide clearances 25 so as to be free to slide. The other ends of the coil springs 20 are supported by the caps 4 via the other spring seats 22. Pilot passages 22a are formed in the other spring seats 22. The pilot passages 22 axially pass through the other spring seats 22 and connect the pilot chambers 5 to a pilot circuit not shown in the figure.

In order to maintain the pilot chambers 5 in a tightly closed state, sealing members 30 seals joint parts between the caps 4 and the spool housing.

An axial passage 23 is formed in the spool 3. The axial passage 23 is formed at a location offset from the center axis of the spool 3 in parallel with the center axis. An end of the axial passage 23 has an opening 23a on the radially outer side of the projection 3a on an end surface of the spool 3. The opening 23a faces the spring seat 21. When the coil spring 20 is in the most extended state, the spring seat 21 closes the opening 23a.

A small hole 24 is formed along the radial direction from the outer periphery of the spool 3 toward the axial passage 23. The small hole 24 is formed in such an angular position that a distance between the outer periphery of the spool 3 and the axial passage 23 at the offset location is the shortest. In a case where the spool 3 is placed in the neutral position shown in the figure, the small hole 24 is closed by facing a wall surface of the spool hole 2. Meanwhile, in a process of displacement of the spool 3, the small hole communicates with the tank passage 12.

In the change-over valve, in a case where the spool 3 is placed in the neutral position shown in the figure, the actuator passages 10 and 11 are blocked from the tank passage 12 and the pump passage 13 by the lands 6a to 6e.

When the pilot pressure is conducted to the pilot chamber 5 for example on the right side in the figure from the state of the figure and the spool 3 moves leftward, the actuator passage 11 communicates with the bridging passage 15 via the annular indentation 7d of the spool. The pump passage 13 and the center passage 14 communicate via the notches n formed in the center land 6c.

When a pressure of the center passage 14 increases and exceeds a pressure of the spring member 17 of the flow control valve 16 due to the communication between the center passage 14 and the pump passage 13, the flow control valve 16 is lifted. As a result, the center passage 14 and the bridging passage 15 communicate via the pair of communicating holes 16b. That is, discharge oil of the pump is supplied to the actuator port 9.

In this position, the other actuator passage 10 communicates with the tank passage 12 via the annular indentation 7a of the spool 3. Return oil flowing into the actuator port 8 is returned to the tank.

Meanwhile, in a case where the spool 3 is placed in this position, the small hole 24 having an opening on the outer periphery of the spool 3 communicates with the tank passage 12.

Figure 2:
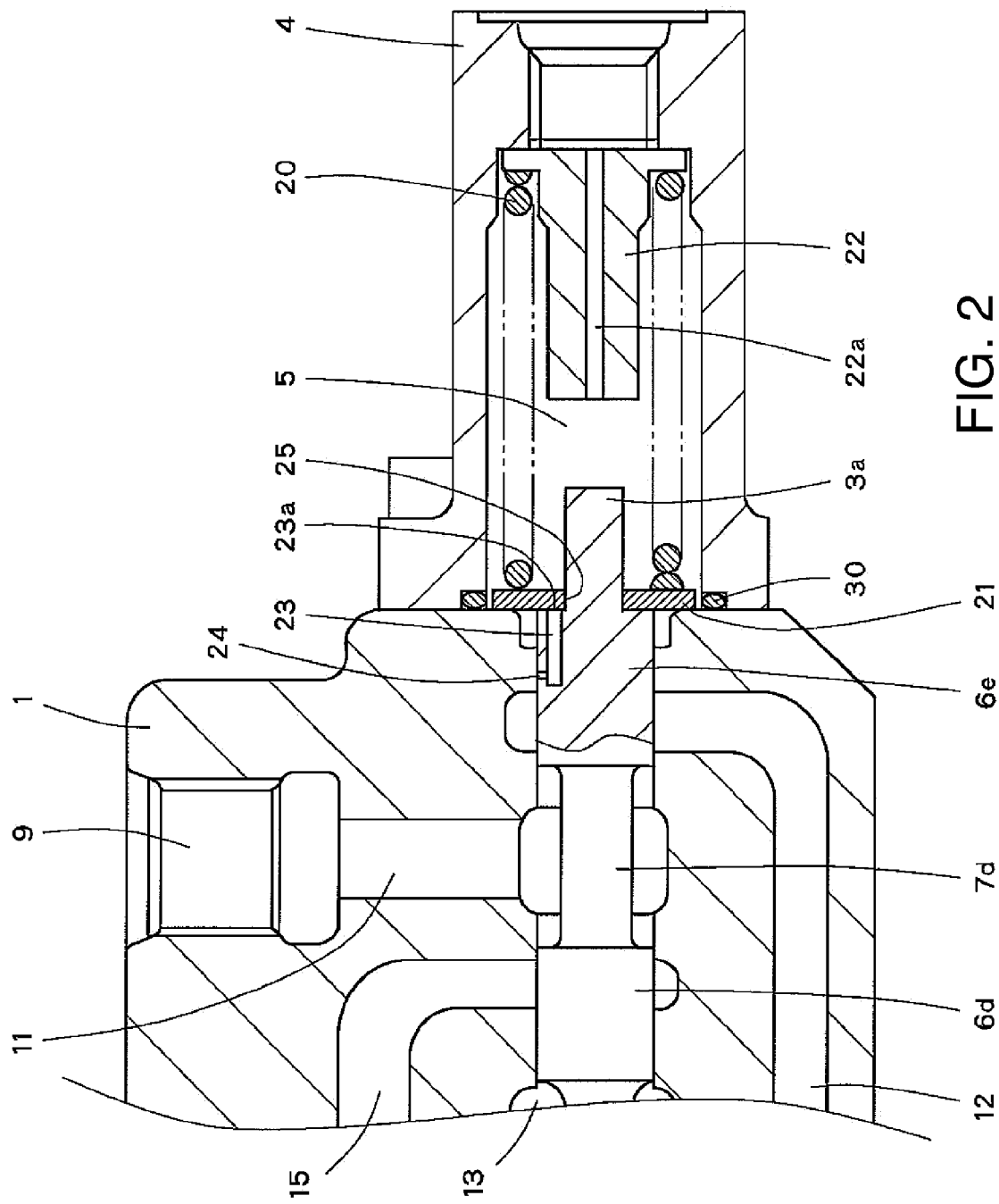
FIG. 2 is an enlarged vertical sectional view of essential parts of the change-over valve.

Referring to FIG. 2, the pilot chamber side opening 23a of the axial passage 23 is closed by the spring seat 21. From this state, when the spool 3 displaces leftward in the figure, the pilot chamber 5 and the pilot chamber side opening 23a communicate via the slide clearance 25 between the outer periphery of the projection 3a and the spring seat 21.

As a result, a minute flow of working oil from the pilot chamber 5 to the tank passage 12 via the slide clearance 25, the axial passage 23, and the small hole 24 is formed. By this minute flow of the working oil, the air coming into the pilot chamber 5 is discharged to the tank.

In this change-over valve, the axial passage 23 is formed at the location offset from the center axis of the spool 3. Therefore, the shortest distance from the outer periphery of the spool 3 to the axial passage 23 is shortened, so that a length of the small hole 24 formed in the angular position corresponding to the shortest distance can be shortened.

When the length of the small hole 24 is short, even a drill having a small diameter can easily form the straight small hole 24. Therefore, a possibility that a tool is damaged at the time of forming the small hole 24 is lowered, so that a hole boring task can be efficiently performed.

Since the axial passage 23 is formed in parallel with the center axis of the spool 3, a length thereof can be shortened more than a case where the axial passage is formed obliquely with respect to the center axis. When the length of the axial passage 23 can be shortened, the axial passage 23 can be accordingly easily formed.

However, regarding an object to shorten the length of the small hole 24, when the axial passage 23 is offset from the center axis of the spool 3, the axial passage is not necessarily particularly formed in parallel with the axis.

When the small hole 24 is formed along the radial direction of the spool 3, that is, along a direction perpendicular to the center axis of the spool 3, the small hole 24 is easily processed. The distance to the axial passage 23 also becomes the shortest. However, the formation direction of the small hole 24 is not necessarily perpendicular to the center axis.

A position where the small hole 24 communicates with the tank passage 12 may be anywhere in the course of the displacement of the spool 3. When position setting is performed such that the small hole 24 and the tank passage 12 communicate upon full stroke of the spool 3, the pilot chamber 5 does not communicate with the tank passage 12 until the spool 3 makes full stroke. For reducing leakage of the pilot pressure to the tank passage 12 during the displacement of the spool 3, such setting may be preferable.

FIGS. 1 and 2 only show the axial passage 23 and the small hole 24 on the side of one of the pilot chambers 5. However, on the side of the other pilot chamber 5, an axial passage 23 and a small hole 24 having the same specification as the above are also formed in the end of the spool 3.

When the pilot pressure is conducted to the pilot chamber 5 on the left side of the figure, the spool 3 moves rightward, and the pilot chamber 5 communicates with the tank passage 12 via the small hole 24 and the axial passage 23 on the left side.

Figure 3:
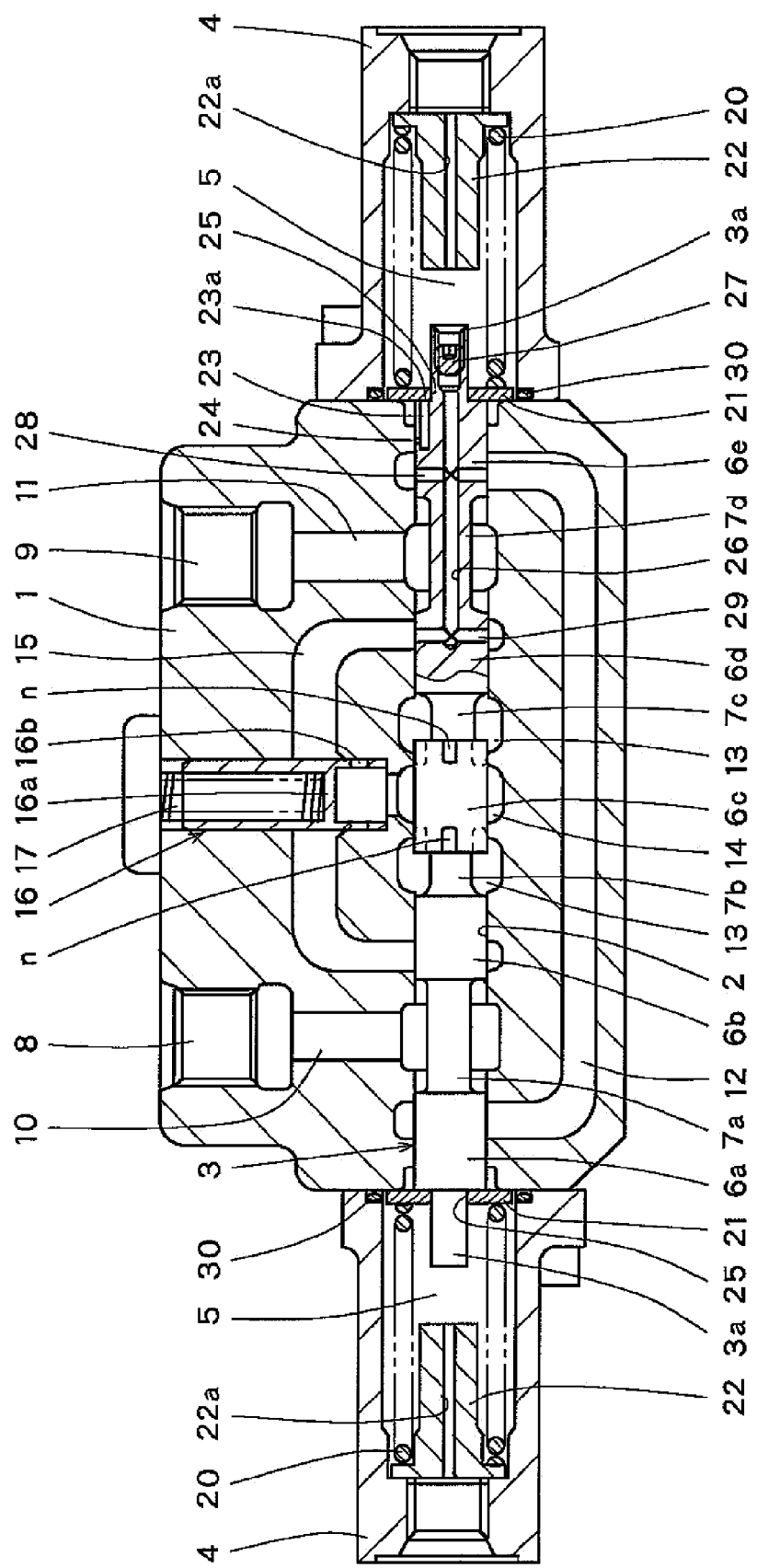
FIG. 3 is a vertical sectional view of a change-over valve according to a second embodiment of this invention.
Figure 4:
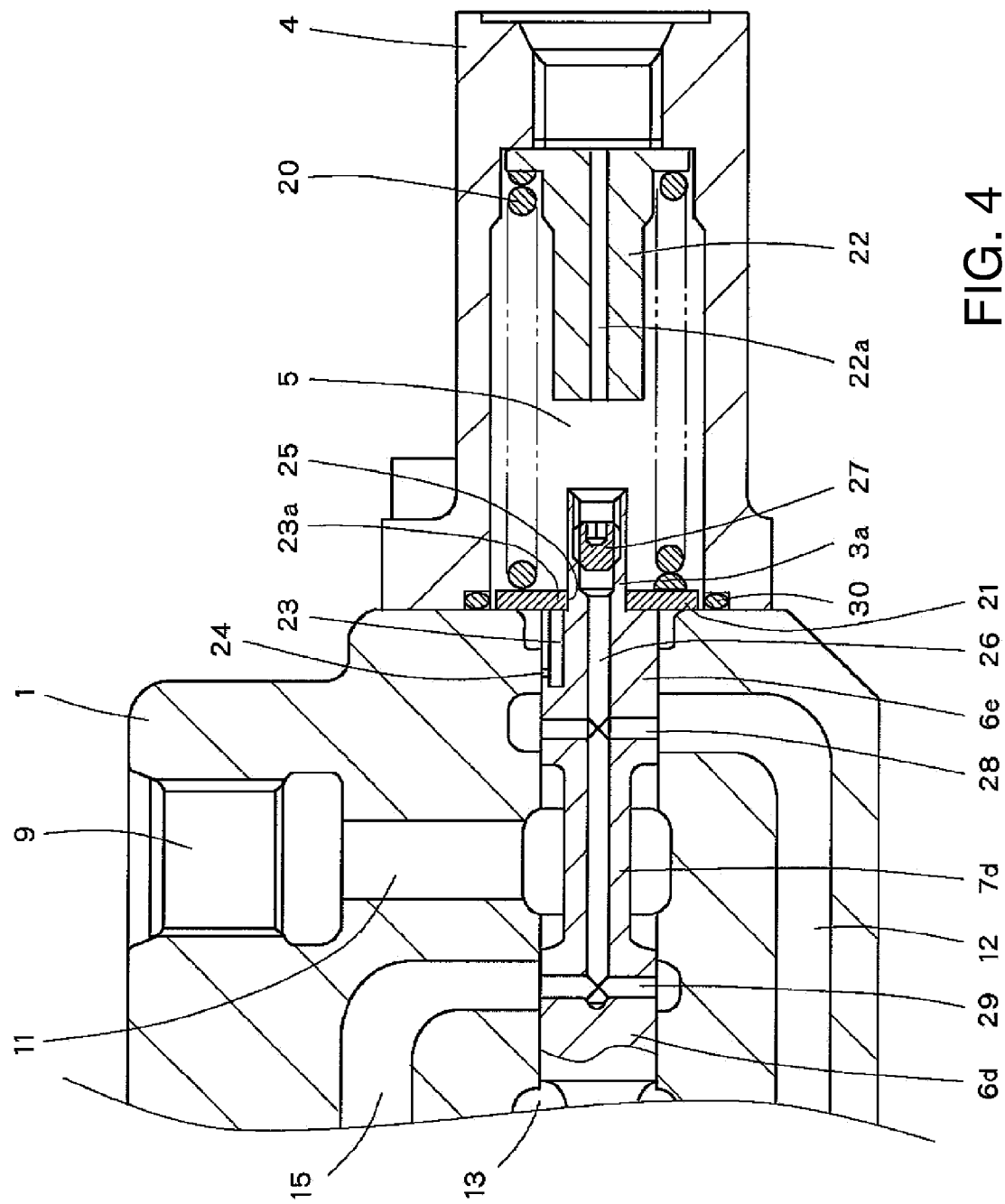
FIG. 4 is an enlarged vertical sectional view of essential parts of the change-over valve according to the second embodiment of this invention.

Referring to FIGS. 3 and 4, a second embodiment of this invention will be described.

A change-over valve according to this embodiment is different from the first embodiment in the point that an axial oil passage 26 and radial direction oil passages 28 and 29 are formed in the spool 3. Other configurations are identical to those of the first embodiment. With respect to the components of the second embodiment that have the same construction as those of the first embodiment are given identical component numbers, and their description is herein omitted.

In the change-over valve according to the second embodiment, the spool 3 is also housed in the spool hole 2 formed in the spool housing 1 so as to be free to slide. Both the ends of the spool 3 respectively face the pilot chambers 5 in the pair of caps 4 fixed to the spool housing 1.

In the spool 3, the plurality of lands 6a to 6e to be brought into sliding contact with the spool hole 2 and the annular indentations 7a to 7d are alternately formed. In a case where the spool 3 is placed in the neutral position shown in the figure, the actuator passages 10 and 11 are blocked from both the pump passage 13 and the tank passage 12.

By displacing the spool 3 rightward or leftward in the figure from the neutral position with the pilot pressure conducted to one of the pilot chambers 5, the actuator passage 10 is connected to one of the pump passage 13 and the tank passage 12, and the actuator passage 11 is connected to the other one of the pump passage 13 and the tank passage 12.

In this embodiment, the axial oil passage 26 is formed on the center axis of the spool 3. An end of the axial passage 26 has an opening part on the end surface of the spool 3. A plug 27 closes this opening part.

The radial direction oil passages 28 and 29 are formed in the spool 3 in a form of passing through the spool 3 along the traverse direction. By respectively crossing the axial oil passage 26, the radial direction oil passages 28 and 29 communicate with each other via the axial oil passage 26.

The radial direction oil passage 28 is formed in a position to communicate with the tank passage 12 within a predetermined stroke range of the spool 3. The radial direction oil passage 29 is formed in a position to communicate with the bridging passage 15 within the predetermined stroke range of the spool 3. When the spool 3 displaces and the bridging passage 15 and the pump passage 13 communicate, a part of a flow rate supplied from the pump passage 13 is returned to the tank passage 12 via the radial direction oil passage 29, the axial oil passage 26, and the radial direction oil passage 28, and an oil amount supplied to the actuator passage 11 is limited.

That is, a bleed-off passage for controlling a supply amount of the working oil to the actuator passage 11 is formed by the axial oil passage 26 and the radial direction oil passages 28 and 29.

In this change-over valve, the axial passage 23 and the small hole 24 are also formed in the same positions as the first embodiment.

Therefore, in this change-over valve having the axial oil passage 26 on the center axis, as well as the first embodiment, in accordance with the displacement of the spool 3, a minute flow of the working oil from the pilot chamber 5 to the tank passage 12 via the slide clearance 25, the axial passage 23, and the small hole 24 is also formed. By this minute flow of the working oil, the air coming into the pilot chamber 5 is discharged to the tank.

In this embodiment, the axial passage 23 is also formed at the location offset from the center axis of the spool 3. Thus, the distance of the small hole 24 can be shortened. Therefore, a possibility that the drill is damaged at the time of forming the small hole 24 is lowered, so that the hole boring task can be efficiently performed.

FIG. 4 only shows the axial passage 23 and the small hole 24 on the side of one of the pilot chambers 5. However, on the side of the other pilot chamber 5 shown in FIG. 3, the axial passage 23 and the small hole 24 having the same specification as the above are also formed in the end of the spool 3.

Therefore, when the pilot pressure is conducted to the pilot chamber 5 on the left side of FIG. 3, the spool 3 is moved rightward of the figure, and the pilot chamber 5 communicates with the tank passage 12 via the small hole 24 and the axial passage 23 on the left side. It should be noted that the axial oil passage 26 and the radial direction oil passages 28, 29 can also be formed as a bleed-off passage for controlling a supply amount of the working oil to the actuator passage 10.

As described above, this invention can also be applied to the change-over valve having the axial oil passage 26 on the center axis of the spool 3.

In the embodiments described above, the pilot chamber 5 and the axial passage 23 are connected via the slide clearance 25 between the projection 3a of the spool 3 and the spring seat 21. When an opening area of the slide clearance 25 is smaller than a sectional area of the small hole 24, without depending on a throttle function of the small hole 24, the leakage of the pilot pressure can be reduced. Therefore, by letting the slide clearance 25 function as a throttle, the sectional area of the small hole 24 can be increased, and the small hole 24 can be further easily formed.

In the embodiments described above, both the ends of the spool 3 respectively face the pilot chambers 5. However, this invention can also be applied to the change-over valve in which the pilot chamber 5 is provided only on one side of the spool 3. In that case also, the same preferable effect as the first and second embodiments can be obtained in terms of easily forming the small hole 24.

As the passage for discharging the air in the pilot chamber 5 is easily formed as described above, it is not necessary to make enormous effort to prevent air from coming into the pilot chamber 5 when assembling the change-over valve and a preferable effect can be obtained for improving efficiency in a manufacturing process of the change-over valve.

Figure 5:
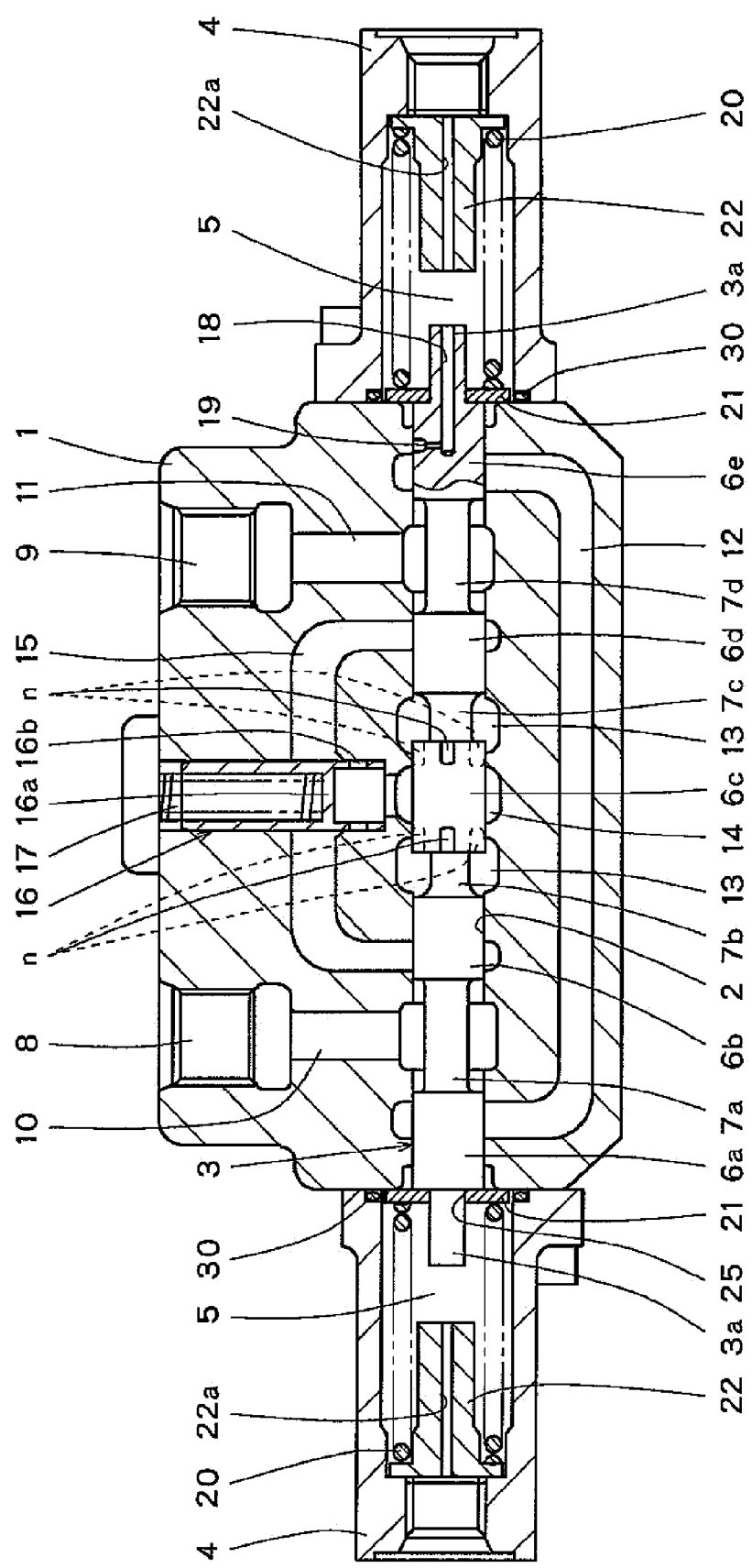
FIG. 5 is a vertical sectional view of a change-over valve according to a comparative example to which this invention is not applied.
Figure 6:
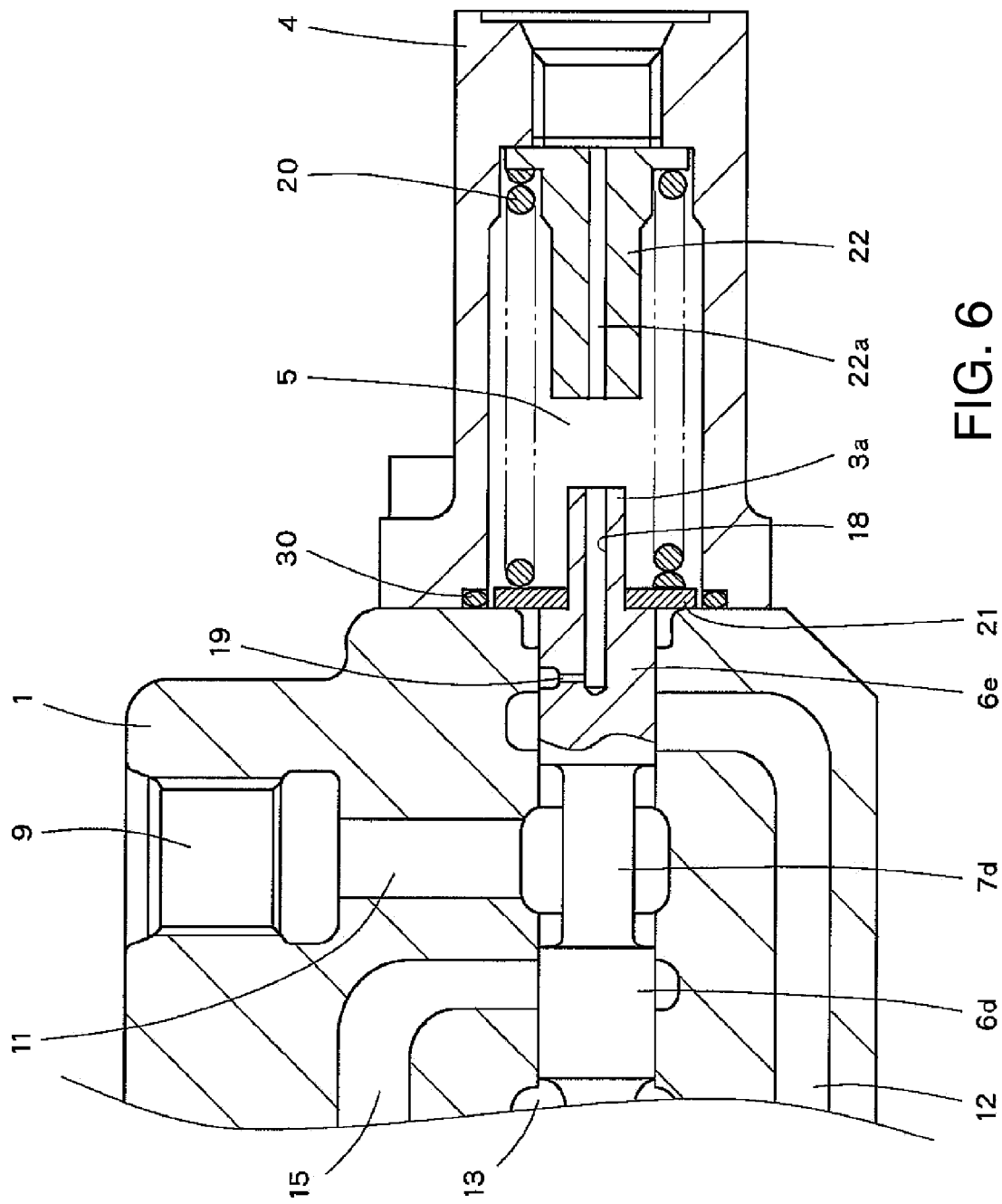
FIG. 6 is an enlarged vertical sectional view of essential parts of the change-over valve according to the comparative example.

Referring to FIGS. 5 and 6 next, a comparative example to which this invention is not applied will be described.

A change-over valve shown in FIGS. 5 and 6 comprises an axial passage 18 formed on the center axis of the spool 3 in place of the axial passage 23 of the first and second embodiments. A small hole 19 formed along the radial direction from the outer periphery of the spool 3 toward the axial passage 18 is formed.

An end of the axial passage 18 passes through the projection 3a and has an opening toward the pilot chamber 5.

The axial passages 18, the small holes 19, and the projections 3a described above are respectively provided in both the ends of the spool 3 of FIG. 5.

Other configurations of the change-over valve are identical to those of the first and second embodiments.

In this change-over valve, in accordance with the displacement of the spool 3, the small hole 19 having an opening on the outer periphery of the spool 3 also communicates with the tank passage 12. As a result, a flow of the working oil from the pilot chamber 5 to the tank passage 12 via the axial passage 18 and the small hole 19 is formed, so that the air in the pilot chamber 5 can be discharged.

In this comparative example also, when a flow rate of the working oil flowing out from the pilot chamber 5 to the tank passage 12 is high, the pilot pressure lowers. In order to suppress a flow-out amount, it is necessary to reduce a diameter of the small hole 19.

In order to reduce the diameter of the small hole 19, a thin drill must be applied to bore the small hole 19. In this comparative example, there is a need for bringing the drill from the outer periphery of the spool 3 to the vicinity of the center axis of the spool 3. A hole boring distance is therefore long. When a drill having a small diameter bores a long hole, the probability of damage to the drill is increased. In other words, such hole boring is not easily performed without damaging the drill.

According to the first and second embodiments of this invention described above, since the small hole 24 is shorter than the comparative example, the hole boring task by the drill of the small hole 24 is easier than a hole boring task by the drill of the small hole 18 of the comparative example, and the probability of the damage to the drill is lowered.

According this invention, therefore, formation of the discharge passage of the air of the pilot chamber becomes easy.

The contents of Tokugan 2012-58164, with a filing date of Mar. 15, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL APPLICABILITY

As described above, this invention provides a preferable effect for rendering the formation of the discharge passage of the air of various pilot type change-over valves easy.

The embodiments of this invention in which an exclusive property or privilege is claimed are defined as follows:

1. A change-over valve, comprising:
   a spool housing;
   a spool housed in the spool housing so as to be free to slide, the spool having a center axis;
   a pilot chamber facing an end of the spool;
   an axial passage formed in the spool at a location offset from the center axis so as to be connected to the pilot chamber;
   a hole formed in the spool, connected to the axial passage, and having an opening on an outer periphery of the spool; and
   a tank passage formed in the spool housing and connected to a tank,
   wherein the spool is configured
      to render a connection between the pilot chamber and the tank passage via the hole when the spool slides in the spool housing in a direction away from the pilot chamber, and
      to shut-off the connection when the spool slides in the spool housing in a direction towards the pilot chamber.

2. The change-over valve according to claim 1, wherein the hole extends perpendicular to the center axis.

3. The change-over valve according to claim 1, wherein the hole is configured to communicate with the tank passage, when the spool slides to a full-stroke position in the direction away from the pilot chamber.

4. The change-over valve according to claim 1, wherein the axial passage extends in parallel with the center axis.

5. The change-over valve according to claim 1,
   wherein the spool has a projection projecting axially in the pilot chamber and is supported by a spring accommodated in the pilot chamber via a spring seat fitted onto an outer periphery of the projection such that the axial passage and the pilot chamber communicate via a slide clearance between the outer periphery of the projection and the spring seat.

6. The change-over valve according to claim 1, wherein the spool comprises another axial passage formed on the center axis and a radial direction passage connected to the another axial passage.

* * * * *